(12) United States Patent
Zarnes

(10) Patent No.: US 12,442,145 B2
(45) Date of Patent: Oct. 14, 2025

(54) E-TRACK CURB RAMP DEVICE

(71) Applicant: Dan Zarnes, Frederick, CO (US)

(72) Inventor: Dan Zarnes, Frederick, CO (US)

( * ) Notice: Subject to any disclaimer, the term of this patent is extended or adjusted under 35 U.S.C. 154(b) by 555 days.

(21) Appl. No.: 18/055,041

(22) Filed: Nov. 14, 2022

(65) Prior Publication Data
US 2023/0183928 A1 Jun. 15, 2023

Related U.S. Application Data

(60) Provisional application No. 63/289,244, filed on Dec. 14, 2021.

(51) Int. Cl.
*E01D 1/00* (2006.01)
*E01C 11/22* (2006.01)

(52) U.S. Cl.
CPC .............. *E01C 11/222* (2013.01); *E01D 1/00* (2013.01)

(58) Field of Classification Search
CPC .................................. E01C 11/222; E01D 1/00
See application file for complete search history.

(56) References Cited

U.S. PATENT DOCUMENTS

| | | | | |
|---|---|---|---|---|
| 3,672,422 A * | 6/1972 | Greipel | ................... | B60B 39/12 238/14 |
| 4,368,553 A * | 1/1983 | Perry | ..................... | B65G 69/30 14/69.5 |
| 5,538,308 A * | 7/1996 | Floe | ......................... | B60P 1/435 296/61 |
| 6,044,511 A * | 4/2000 | Frost | ...................... | A61G 3/061 254/88 |
| 6,185,775 B1 * | 2/2001 | McCarthy | .............. | B65G 69/30 414/537 |
| 7,350,843 B2 * | 4/2008 | Meyers | .............. | B62D 33/0273 296/50 |
| 8,764,088 B1 * | 7/2014 | Jobe | ........................ | B65G 69/30 296/26.11 |
| 10,023,008 B2 * | 7/2018 | Dagrossa | .................. | E01C 9/00 |
| 10,711,408 B1 * | 7/2020 | Divine | .................... | E01C 9/086 |
| D923,905 S * | 6/2021 | Forsberg | ........................ | D34/32 |
| 11,292,382 B2 * | 4/2022 | Johnson | ................ | B60P 7/0807 |
| 2007/0119002 A1 * | 5/2007 | Baranoff | .................. | E01C 9/086 14/69.5 |
| 2007/0294844 A1 * | 12/2007 | Gunnarson | ............. | E04G 21/30 14/69.5 |

* cited by examiner

*Primary Examiner* — Gary S Hartmann
(74) *Attorney, Agent, or Firm* — Brennan, Manna & Diamond, LLC

(57) ABSTRACT

A curb ramp that is designed to be mounted on an e-track for storage. The curb ramp has mounting hardware that is attached to the sides of the ramp and includes a pair of straps with e-track clips. The e-track clips are removably fastened in grooves of the e-track for hanging the curb ramp. The straps are fastened to the side edges of the ramp using fasteners means including a hex bolt, a plurality of flat washers, and a hex nut such that the strap is securely fastened to the ramp. In use, the e-track clips being engaged to the e-track allows the curb ramp to hang therefrom.

20 Claims, 6 Drawing Sheets

E-TRACK CURB RAMP DEVICE

CROSS-REFERENCE TO RELATED APPLICATION

The present application claims priority to, and the benefit of, U.S. Provisional Application No. 63/289,244, which was filed on Dec. 14, 2021, and is incorporated herein by reference in its entirety.

FIELD OF THE INVENTION

The present invention relates generally to the field of curb ramps and mounting systems for same. More specifically, the present invention relates to a novel curb ramp fitted with mounting hardware that allows users to hang or mount the ramp inside a truck, trailer, or other storage area when not in use. The mounting hardware includes straps with e-track clips that are used for hanging the curb ramp on an e-track. The straps are fastened to side(s) of the ramp using bolts, nuts, and fasteners, thereby obviating chances of the ramp being dropped from the e-track. Accordingly, the present disclosure makes specific reference thereto. Nonetheless, it is to be appreciated that aspects of the present invention are also equally applicable to other like applications, devices, and methods of manufacture.

BACKGROUND

By way of background, portable curb ramps are used for easily moving hand trucks, dolly trucks, and more with heavy loads over curbs and steps without jostling the cargo or causing strain to the operator. Operators of trucks and vehicles who carry heavy items such as furniture, containers, heavy boxes, and more generally use curb ramps to maintain safety and easily carry items. Curb ramps allow for easy movement over uneven walking surfaces, obviating the need to lift and pull fully loaded hand trucks and are beneficial for delivering packages, beverage cases, and more. The curb ramps can be removably placed on a road surface and are compatible with gravel or asphalt used for transition over curbs or driveways.

Commonly, when curb ramps are not used, they are stored in the back of a truck or trailer. The curb ramps when stored with other items may get damaged or scratched and also risk damage to other items in the storage area. Further, due to lack of storage space inside trucks and trailers, the curb ramps are not safely stored and placed. In many cases, people need to constantly move the ramp out of the way when looking for other items in the truck storage area. People desire an improved way of storing and transporting standard portable curb ramps in trucks and trailers.

Therefore, there exists a long-felt need in the art for a portable curb ramp storage system. There is also a long-felt need in the art for an improved curb ramp that has a mountable safety mechanism attached thereto. Additionally, there is a long-felt need in the art for a curb ramp storage system that prevents loose storage of the ramp inside a trailer or truck. Moreover, there is a long-felt need in the art for a mounting hardware that can be attached to any standard portable curb ramp and helps in safe storage of the curb ramp. Further, there is a long-felt need in the art for a portable curb ramp storage attachment that improves efficiency when storing and transporting cargo. Furthermore, there is a long-felt need in the art for a mounting hardware for a standard curb ramp that ensures that the curb ramp is kept at a singular location and protects same from physical damage. Finally, there is a long-felt need in the art for an improved curb ramp that can be securely attached to any mounted e-track in a commercial vehicle box or trailer thereby improving efficiency and security.

The subject matter disclosed and claimed herein, in one embodiment thereof, comprises an e-track curb ramp designed to be mounted on any e-track for secured and easy storage. The curb ramp has a mounting hardware that allows the curb ramp to securely mount to the e-track for preventing loose storage in a vehicle, trailer, and the like. More specifically, the mounting hardware has a pair of straps, each strap is removably fastened to a side edge of the curb ramp, the fastening of each strap includes, for example, a 2-inch by 0.5-inch hex bolt, a plurality of 1-inch by 0.5-inch flat washers, and 0.5-inch hex nut. The free end of each strap has a thumb-pressed and durable e-track clip configured to removably attach to a groove of a wall mounted e-track such that the e-track clip of each strap is accommodated in the grooves of the e-track for mounting the e-track curb ramp to the e-track. By mounting the ramp, the ramp cannot move freely around the cargo area and ensures that the ramp is kept in a singular, easily accessible location when use is desired.

In this manner, the e-track curb ramp of the present invention accomplishes all of the forgoing objectives and provides users with a mountable safety mechanism for standard curb ramps. The curb ramp can be hung or mounted on an e-track inside a truck, trailer, or other storage area when not in use thereby preventing loose storage of the ramp and reducing the risk of damage. Further, the curb ramp improves efficiency when storing and transporting cargo, obviating the need to constantly move the ramp out of the way when looking for other items in the storage area.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an e-track curb ramp designed to be mounted to any e-track. The curb ramp is designed as a conventional curb ramp with a mounting hardware. The mounting hardware allows the curb ramp to securely mount to the e-track for preventing loose storage in a vehicle, trailer, and the like. More specifically, the curb ramp has a sloping platform designed to slope downwards from a raised end to a base such that the raised end is placed on a raised walkway, a pair of straps, each strap is removably fastened to a side edge of the curb ramp, the fastening of each strap includes, for example, a 2-inch by 0.5-inch hex bolt, a plurality of 1-inch by 0.5-inch flat washers, and 0.5-inch hex nut. The free end of each strap has an e-track clip configured to removably attach to a wall mounted e-track, such that the e-track clip of each strap is accommodated in the grooves of the e-track for mounting the e-track curb ramp to the e-track. The straps are about 8-inches long and are made of durable polyester and can be adjusted using a slider.

In yet another embodiment, a mounting hardware arrangement for a curb ramp is disclosed. The mounting hardware is used for mounting the curb ramp on an e-track for secured and efficient storage. The mounting hardware comprising a pair of polyester straps, the straps are securely attached to the side edges of the ramp, each strap is secured using, for example, a 2-inch by 0.5-inch hex bolt, which is passed through a hole of the corresponding side edge and a hole in the strap, the hex bolt is secured using a 0.5-inch hex nut and a plurality of washers wherein the holes of the side edge and the strap are sandwiched between the plurality of washers; each strap has an e-track clip attached to a free end such that the e-track clips of the straps are accommodated and fastened to grooves of the e-track for secure storage of the curb ramp.

In yet another embodiment, a method of mounting a curb ramp on an e-track is described. The method includes the steps of providing an e-track hardware mounted curb ramp; the curb ramp has hardware including, for example, two sets of 8-inch straps connected to an e-track clip, two sets of 2-inch by 0.5-inch hex bolts, two sets of 0.5-inch hex nuts and a plurality of 1-inch by 0.5-inch flat washers; wherein one hex bolt, one hex nut and a plurality of 1-inch by 0.5-inch flat washers which are used for fastening one strap to each side of the ramp; fastening the e-track clips of the straps to grooves of the e-track, such that the ramp is hung using the straps on the e-track.

The mounting mechanism of the curb ramp improves efficiency when storing and transporting cargo, obviating the need to constantly move the ramp out of the way when looking for other items in the storage area and ensures that the curb ramp is handled and stored carefully, thereby increasing the life span of a curb plate.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
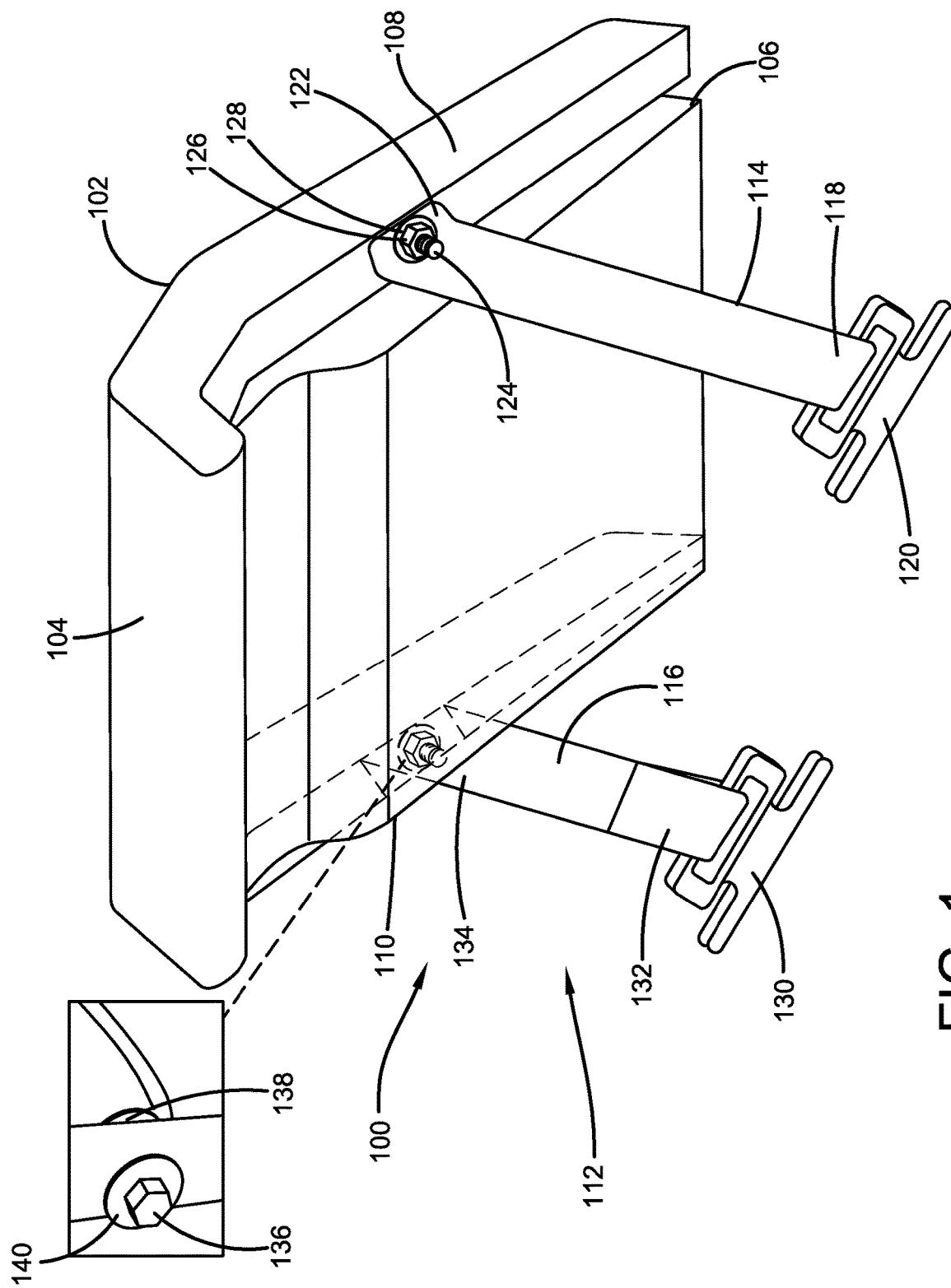
FIG. 1 illustrates a perspective view of one potential embodiment of a mounting hardware fitted standard curb ramp of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention, and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a portable curb ramp storage system. There is also a long-felt need in the art for an improved curb ramp that has a mountable safety mechanism attached thereto. Additionally, there is a long-felt need in the art for a curb ramp storage system that prevents loose storage of the ramp inside a trailer or truck. Moreover, there is a long-felt need in the art for a mounting hardware that can be attached to any standard portable curb ramp and helps in safe storage of the curb ramp. Further, there is a long-felt need in the art for a portable curb ramp storage attachment that improves efficiency when storing and transporting cargo. Furthermore, there is a long-felt need in the art for a mounting hardware for a standard curb ramp that ensures that the curb ramp is kept at a singular location and protects same from physical damage. Finally, there is a long-felt need in the art for an improved curb ramp that can be securely attached to any mounted e-track in a commercial vehicle box or trailer thereby improving efficiency and security.

The present invention, in one exemplary embodiment, is a mounting hardware for a curb ramp. The mounting hardware is used for mounting the curb ramp on an e-track and can be used with any conventional curb ramp. The mounting hardware comprising a pair of straps, the straps are securely attached to the side edges of the ramp, each strap is secured using, for example, a 2-inch by 0.5-inch hex bolt passed through a hole of the corresponding side edge and a hole in the strap, the hole in the side edges is near the raised end of the ramp, the hex bolt is secured using a 0.5-inch hex nut and a plurality of washers wherein the holes of the side edge and the strap are sandwiched between the plurality of washers; each strap has an e-track clip attached to a free end, such that the e-track clips of the straps are accommodated and fastened to grooves of the e-track for secured storage of the curb ramp.

Referring initially to the drawings, FIG. 1 illustrates a perspective view of one potential embodiment of a mounting hardware fitted standard curb ramp of the present invention in accordance with the disclosed architecture. The mounting hardware fitted standard curb ramp 100 of the present embodiment is designed as an improved portable curb ramp 100 that functions similar to a conventional curb ramp to ease transportation of hand trucks, dollies, and more, and can be fastened to a mounted e-track in a commercial vehicle box or trailer for easy and secure storage and transportation. More specifically, the curb ramp 100 includes a deck platform 102 having a slope from a top lip 104 to the base 106. The deck platform 102 is configured to be used to permit an operator to move a load, such as a hand truck, or other wheeled cart, up a ramp on which the curb ramp 100 is positioned. Preferably, the deck platform 102 is formed from a non-slip material or can be coated with a non-slip surface coating, such as a non-slip paint, for example.

The top lip 104 is the raised end of the deck platform 102 and is designed to be easily positioned on a curb or raised walkway. The curb ramp 100 has a pair of side edges or supports 108, 110 which are integrally attached to the deck platform 102. For easily and securely storing the curb ramp 100, the curb ramp 100 has a mounting hardware 112 removably attached thereto. The mounting hardware 112 includes a pair of 8-inch straps 114, 116 attached to the side edges 108, 110, respectively. The straps 114, 116 are preferably made of nylon and are adjustable having a pair of opposite ends. The strap 114 has a first end 118 having an e-track clip 120 and an opposite end 122 fastened to the side edge 108. The strap 114 is fastened using, for example, a 2.0-inch by 0.5-inch hex bolt 124, which is passed through a hole on the edge 108 and is secured using 0.5-inch hex nut 126 and a plurality of 1.0-inch by 0.5-inch flat washers 128 (described in detail in FIG. 4). The e-track clip 120 is used for clipping the strap 114 to an e-track mounted on any surface in a vehicle trailer or box truck, thereby preventing movement of the curb ramp 100.

Similarly, the strap 116 has an e-track clip 130 at a first end 132 and the opposite end 134 is fastened to the side edge 110. The strap 116 is fastened by, for example, a 2.0-inch by 0.5-inch hex bolt 136, which is passed through a hole on the edge 110 and is secured using 0.5-inch hex nut 138 and a plurality of 1.0-inch by 0.5-inch flat washers 140. The e-track clip 130 is used for clipping the strap 116 to an e-track mounted on any surface in a vehicle trailer or box truck, thereby preventing movement of the curb ramp 100.

The straps 114, 116 are preferably fastened through the holes near the top lip 104. Further, the straps 114, 116 have the same length and width, thereby enabling the curb ramp 100 to align symmetrically while being mounted to an e-track. The clips 120, 130 are made of rust-resistant metal and are durable and designed for everyday use. The straps 114, 116 act as anchors for securely holding the curb ramp 100 while also not inhibiting conventional use of the curb ramps for placement on a raised walkway or slope.

Figure 2:
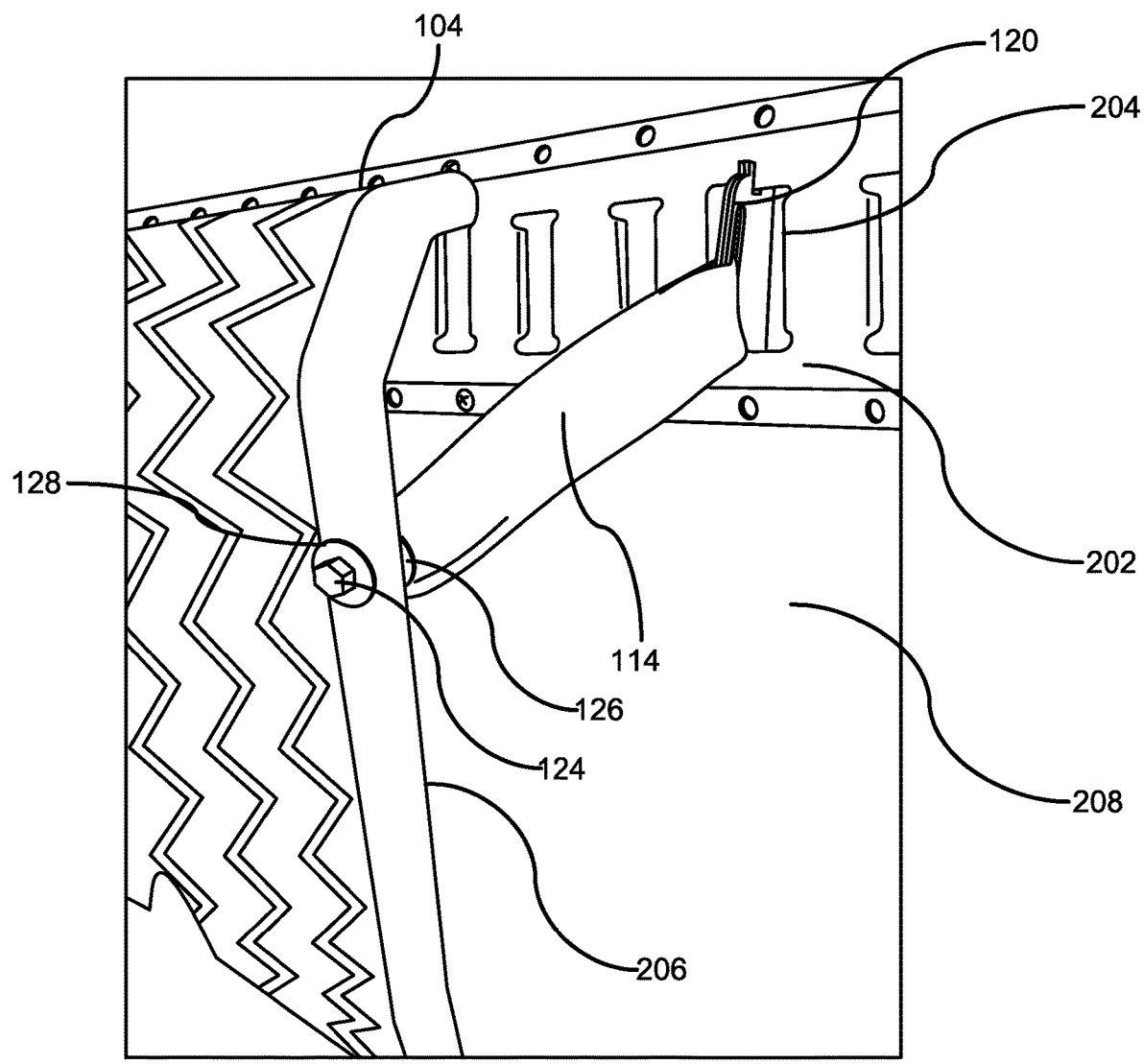
FIG. 2 illustrates a partial perspective view, showing the curb ramp mounted to an e-track placed on a wall of a trailer for secured storage in accordance with the disclosed architecture.

FIG. 2 illustrates a partial perspective view showing the curb ramp 100 mounted to an e-track placed on a wall of a trailer for secured storage in accordance with the disclosed architecture. In the present embodiment, the clipping of the e-track clip 120 to the e-track 202 is shown as an example and the other e-track clip 130 is fastened to the e-track 202 in a similar manner for supporting and mounting the curb ramp 100. As illustrated, the e-track clip 120 is removably fastened in one of the grooves 204 of the e-track 202 such that the groove receives and engages with the clip 120. When the clip 120 is fastened, the strap 114 is extended such that the strap 114 supports the curb ramp 100 and prevents the curb ramp 100 from falling. The length of the strap 114 (and 116) is designed such that the top lip 104 of the curb ramp 100 may touch or support the e-track 202 and the bottom surface 206 of the platform 102 touches the wall 208 of the trailer or vehicle.

The fastening means including the 2.0-inch by 0.5-inch hex bolt 124 secured using 0.5-inch hex nut 126 and a plurality of 1-inch by 0.5-inch flat washers 128 securely hold the strap 114 at the side edge 108. It should be appreciated that curb ramp 100 is not required to be stored with other items in a trailer or vehicle as the ramp 100 can be mounted to any conventional e-track, which is commonly found in trucks, trailers, and more. The curb ramp 100 can also be easily mounted in storage houses, garages, and more, thus enabling placement at a single space and obviating searching of the curb ramp 100.

Figure 3:
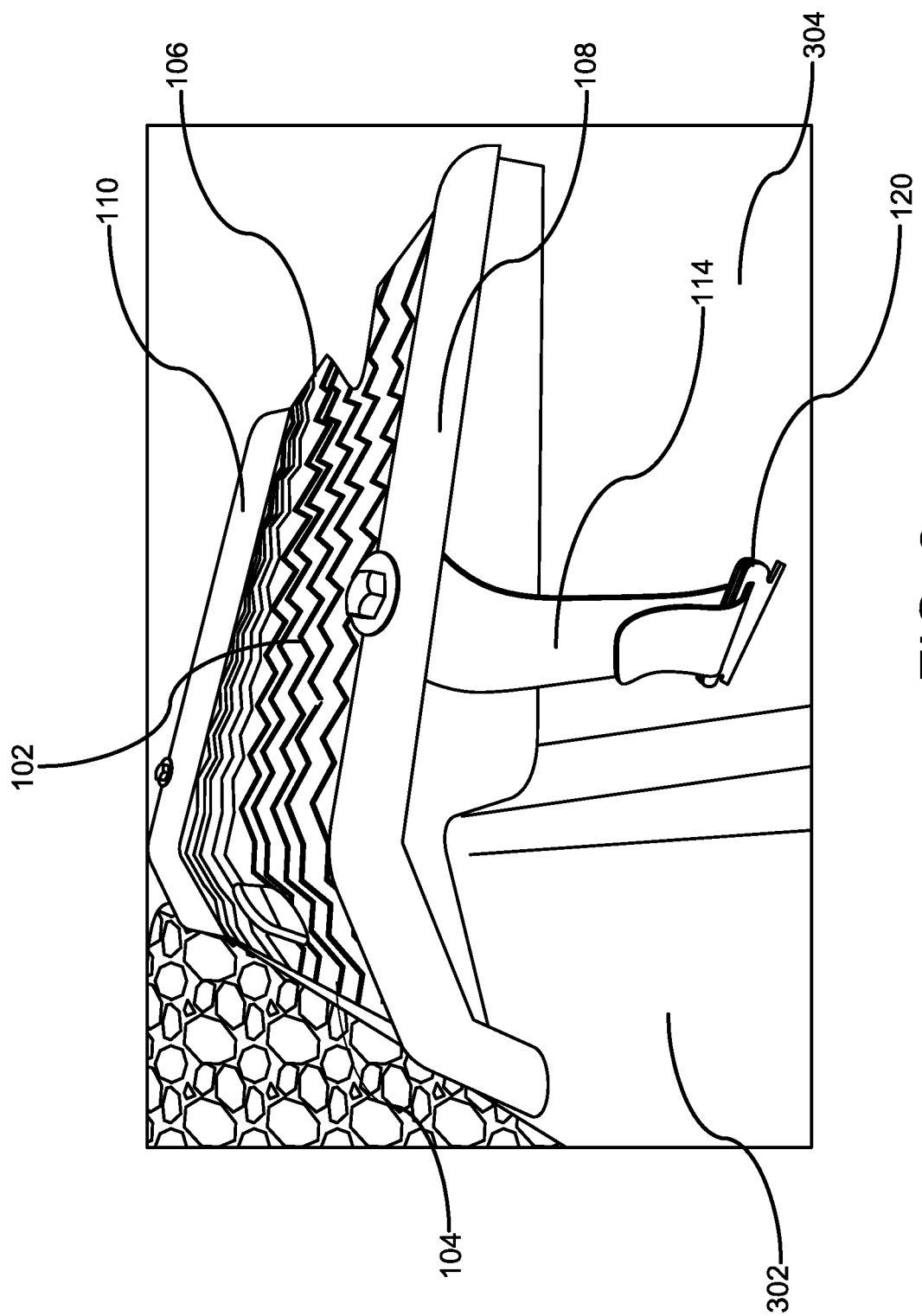
FIG. 3 illustrates a side perspective view of the curb ramp of the present invention positioned on a raised walkway for easy movement in accordance with the disclosed architecture.

FIG. 3 illustrates a side perspective view of the curb ramp 100 of the present invention positioned on a raised walkway for easy movement in accordance with the disclosed architecture. As described earlier, the curb ramp 100 functions like a conventional curb ramp 100 and can be used for easy movement of containers, boxes, hand trucks, and more to a raised platform or walkway 302. In use, the curb ramp 100 is positioned such that top lip 104 is positioned on the raised platform or curb 302 and the base 106 is positioned on the lower surface 304. The platform 102 supports the movement of items and the straps 114, 116 remain loose such that the respective e-track clips of the straps 114, 116 are in an unfastened position.

It should be noted that the straps 114, 116 may be extendable in one embodiment of the present invention that helps in adjusting length of the straps 114, 116. Preferably, a slide adjuster is used for adjusting a length of the strap which can be pulled for shortening or lengthening the strap.

The curb ramp 100 can be made in various lengths and widths with the accompanying straps of adjustable and different lengths. Further, the curb ramp 100 can be designed to be compliant with the Americans with Disabilities Act (ADA) and is made from a strong, lightweight material.

Figure 4:
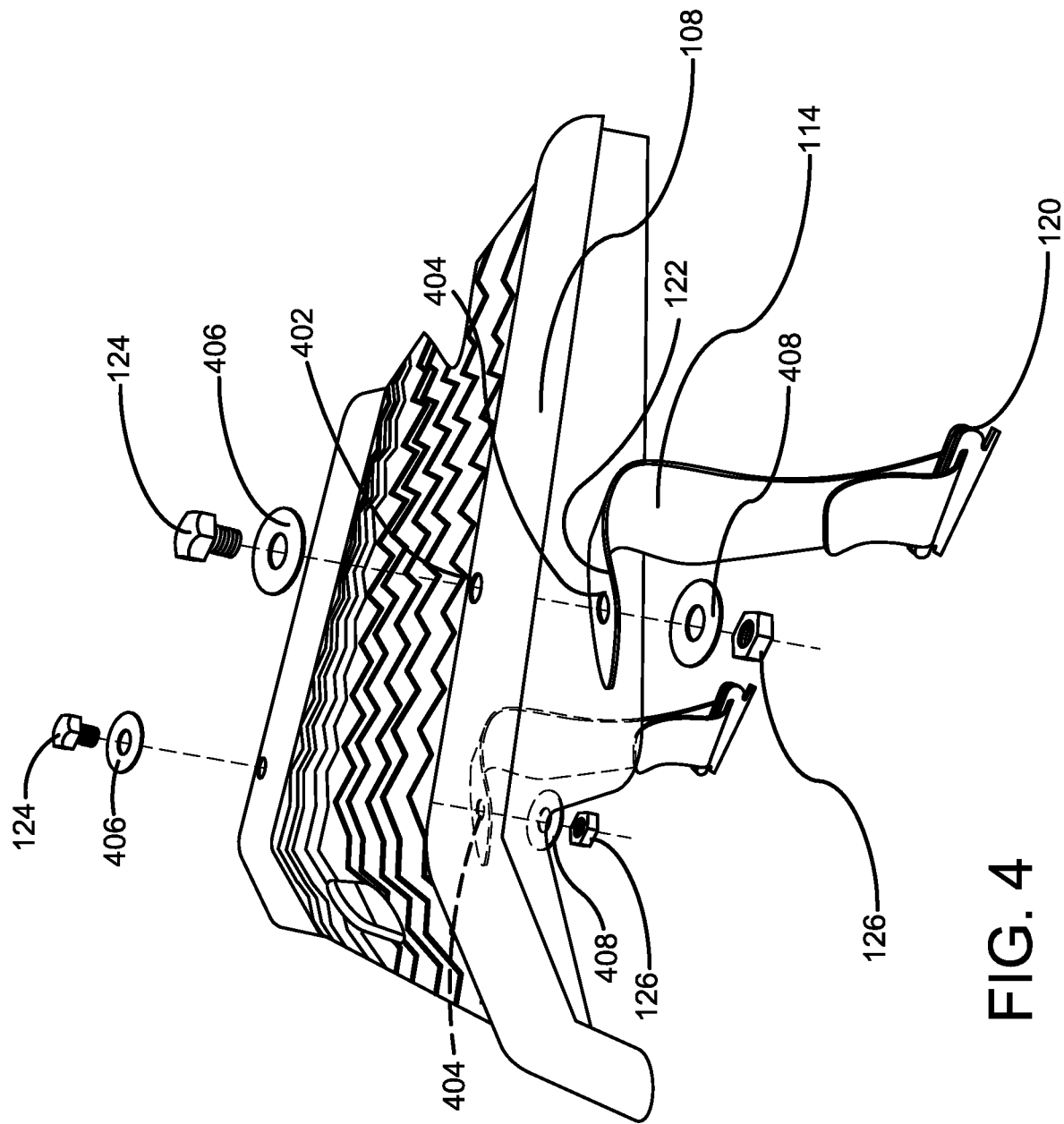
FIG. 4 illustrates an enlarged view of the attachment of the strap with a side edge of the improved curb ramp of the present invention in accordance with the disclosed architecture.

FIG. 4 illustrates an exploded view of the attachment of the strap with a side edge of the improved curb ramp of the present invention in accordance with the disclosed architecture. In one exemplary embodiment, the side edge 108 has a hole 402 through which the hex bolt 124 is passed through such that the head of the bolt is positioned on top of the side edge 108. It should be noted that the strap 114 also has a hole 404 which is aligned with the hole 402 wherein the hex bolt 124 is passed through both holes 402, 404. A washer 406 is positioned on the hole 402 before passing through the bolt 124. Then, a second washer 408 is positioned on the opposite side of the bolt 124 such that the end 122 of the strap 114 is sandwiched between the washers 406, 408. The hex nut 126 is used for fastening the bolt such that the nut is fastened below the strap and the washer 408.

The straps are preferably made of durable polyester and are water and UV ray resistant to minimize the risks of mold/mildew growth. The straps do not shrink or elongate when wet and provide reliable securement. The straps have reinforced stitching and are highly visible.

The e-track mounted curb ramp 100 can take a wide variety of forms and dimensions because ramps/slopes can have different forms and shapes, i.e., to conform to the angles between the curbs and the associated road and ground levels.

Figure 5:
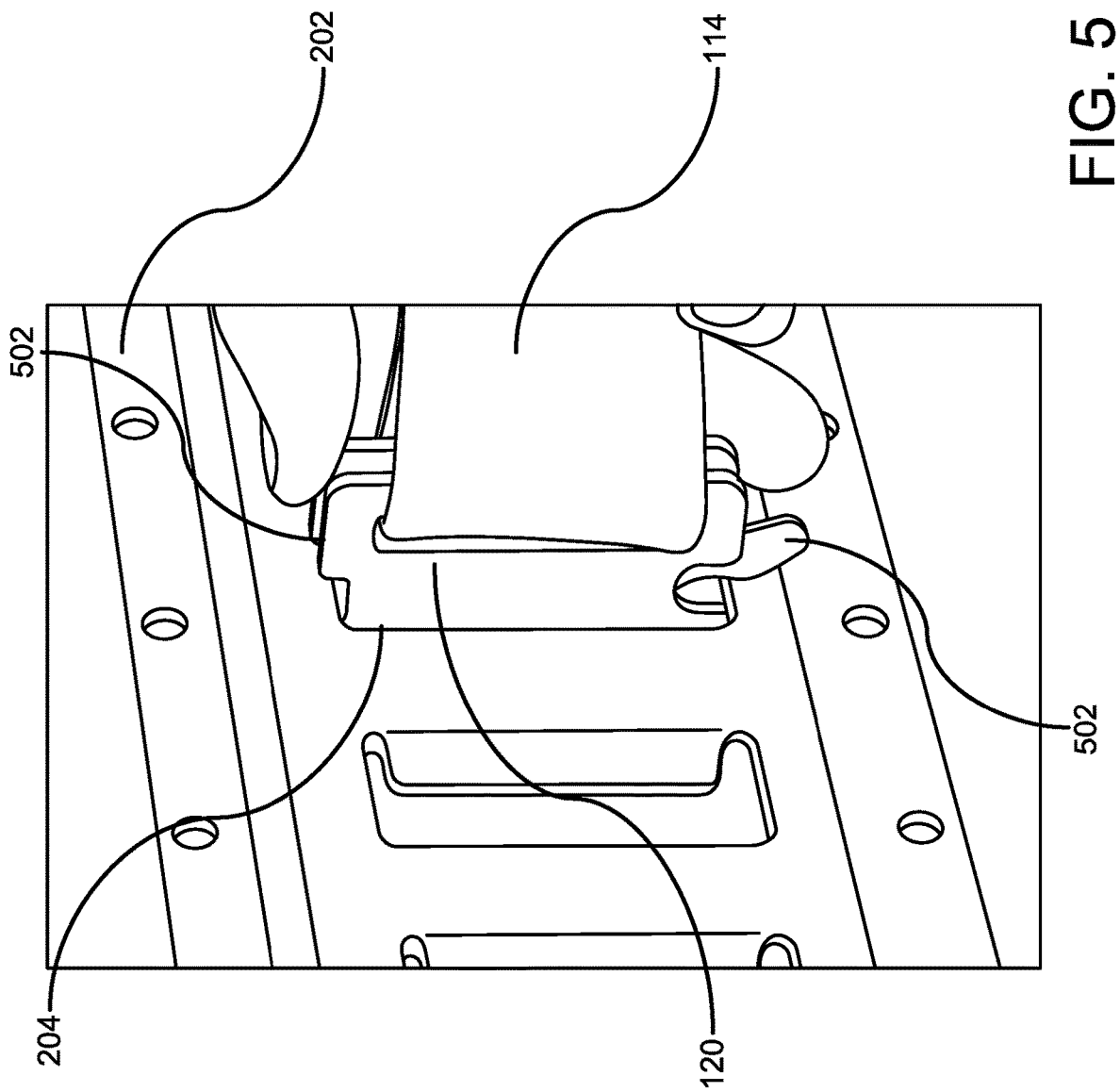
FIG. 5 illustrates an enlarged view, showing how the e-track clip is engaged to an e-track groove for mounting the curb ramp in accordance with the disclosed architecture.

FIG. 5 illustrates an enlarged view showing how the e-track clip is engaged to an e-track groove for mounting the curb ramp in accordance with the disclosed architecture. The e-track clips such as the clip 120 can be a thumb-pressed clip, where a protrusion 502 is pressed by a user to secure and engage the clip 120 in the groove 204. When the protrusion 502 is pressed, the clip is accommodated in the groove 204 and is released enabling the protrusion 502 to abut the groove walls. For releasing the clip 120 from the groove 204, the clip 120 is simply pulled thereby enabling the protrusion 502 to be released thereby releasing the clip 120.

Figure 6:
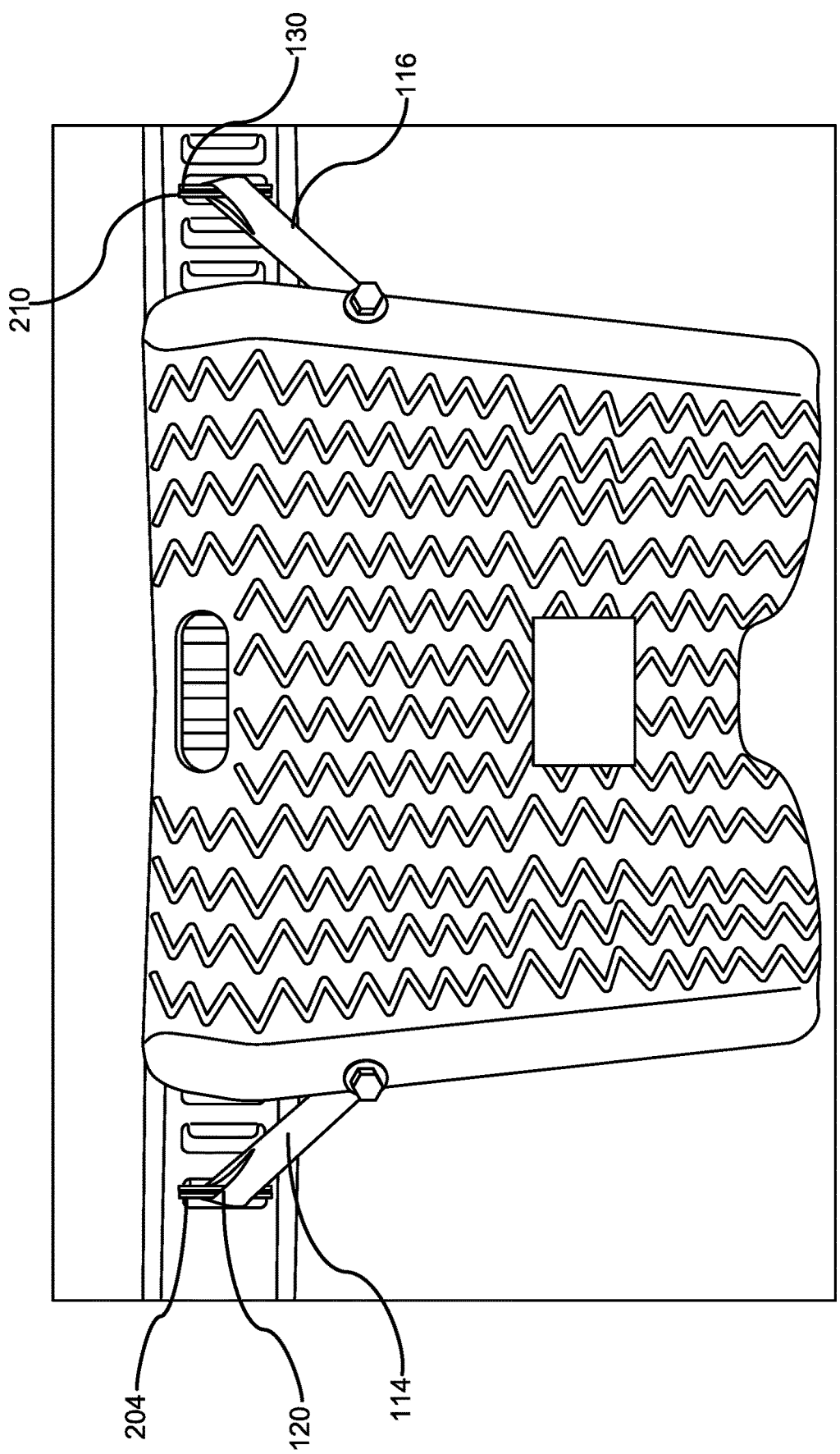
FIG. 6 illustrates a front perspective view of the curb ramp being mounted on an e-track in accordance with the disclosed architecture.

FIG. 6 illustrates a front perspective view of the curb ramp being mounted on an e-track in accordance with the disclosed architecture. As illustrated, the straps 114, 116 are used for hanging the ramp 100 by hooking the clips 120, 130 in the grooves 204, 210 respectively. This eliminates insecure storing of the ramp in any storage area. For accessing the ramp 100 for use, the clips 120, 130 are easily released from the grooves 204, 210 and the ramp 100 can be placed as shown in FIG. 3.

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "e-track mounted curb ramp", "curb ramp", "mounting hardware fitted standard curb ramp", and "improved portable curb ramp" are interchangeable and refer to the mounting hardware fitted standard curb ramp 100 of the present invention.

Notwithstanding the forgoing, the mounting hardware fitted standard curb ramp 100 of the present invention can be of any suitable size and configuration as is known in the art without affecting the overall concept of the invention, provided that it accomplishes the above-stated objectives. One of ordinary skill in the art will appreciate that the mounting hardware fitted standard curb ramp 100 as shown in the FIGS. are for illustrative purposes only, and that many other sizes and shapes of the mounting hardware fitted standard curb ramp 100 are well within the scope of the present disclosure. Although the dimensions of the mounting hardware fitted standard curb ramp 100 are important design parameters for user convenience, the mounting hardware fitted standard curb ramp 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A curb ramp for moving a wheeled load over a curb, the curb ramp comprising:
    a pair of side edges and a deck platform including a non-slip surface sloping from a top lip to a base;
    wherein said top lip forming a raised end of said deck platform for positioning on a curb;
    wherein said curb ramp having a plurality of mounting hardware components for securing said curb ramp in a storage position;
    wherein said plurality of mounting hardware having a first adjustable strap attached to a first side edge and a second adjustable strap attached to a second side edge;
    wherein said first adjustable strap having a first free end, including a first e-track clip and a second end with a first fastener fastened to a first said side edge;
    wherein said second adjustable strap having a first free end, including a second e-track clip and a second end with a second fastener fastened to a second said side edge;
    wherein said first fastener having a bolt passing through a hole in said first said side edge and secured with a nut;
    wherein said second fastener having a bolt passing through a hole in said second said side edge and secured with a nut;
    wherein said first e-track clip for clipping said first adjustable strap to an e-track; and
    further wherein said second e-track clip for clipping said second adjustable strap to said e-track.

2. The curb ramp of claim 1, wherein said e-track is mounted to a vehicle trailer for securing said curb ramp thereto.

3. The curb ramp of claim 1, wherein said e-track is mounted to a box truck for securing said curb ramp thereto.

4. The curb ramp of claim 1, wherein said plurality of mounting hardware removably attached to said curb ramp.

5. The curb ramp of claim 1, wherein said first fastener and said second fastener connected proximal to said top lip.

6. The curb ramp of claim 1, wherein said first adjustable strap having a first length and said second adjustable strap having a second length, and further wherein said first length is the same as said second length.

7. The curb ramp of claim 1, wherein said first e-track clip and said second e-track clip having a material of rust-resistant metal.

8. The curb ramp of claim 1, wherein said first e-track clip removably fastened into a first groove in said e-track, and further wherein said second e-track clip removably fastened into a second groove in said e-track.

9. The curb ramp of claim 1, wherein said first adjustable strap and said second adjustable strap having adjustable lengths.

10. A curb ramp for moving a wheeled load over a curb, the curb ramp comprising:
    a pair of side edges and a deck platform including a non-slip surface sloping from a top lip to a base;
    wherein said top lip forming a raised end of said deck platform for positioning on a curb;
    wherein said curb ramp having a plurality of mounting hardware components for securing said curb ramp in a storage position;
    wherein said plurality of mounting hardware having a first adjustable strap attached to a first side edge and a second adjustable strap attached to a second side edge;

wherein said first adjustable strap having a first free end, including a first e-track clip and a second end with a first fastener fastened to a first said side edge;

wherein said second adjustable strap having a first free end, including a second e-track clip and a second end with a second fastener fastened to a second said side edge;

wherein said first e-track clip for clipping said first adjustable strap to an e-track;

wherein said second e-track clip for clipping said second adjustable strap to said e-track;

wherein said first e-track clip removably fastened into a first groove in said e-track; and further wherein said second e-track clip removably fastened into a second groove in said e-track.

11. The curb ramp of claim 10, wherein said e-track is mounted to a vehicle trailer for securing said curb ramp thereto.

12. The curb ramp of claim 10, wherein said e-track is mounted to a box truck for securing said curb ramp thereto.

13. The curb ramp of claim 10, wherein said first fastener having a bolt passing through a hole in said first said side edge and secured with a nut, and further wherein said second fastener having a bolt passing through a hole in said second said side edge and secured with a nut.

14. The curb ramp of claim 13, wherein said plurality of mounting hardware removably attached to said curb ramp.

15. The curb ramp of claim 14, wherein said first fastener and said second fastener connected proximal to said top lip.

16. The curb ramp of claim 15, wherein said first adjustable strap having a first length and said second adjustable strap having a second length, and further wherein said first length is the same as said second length.

17. The curb ramp of claim 16, wherein said first e-track clip and said second e-track clip having a material of rust-resistant metal.

18. The curb ramp of claim 17, wherein said first adjustable strap and said second adjustable strap having adjustable lengths.

19. A curb ramp for moving a wheeled load over a curb, the curb ramp comprising:

a pair of side edges and a deck platform including a non-slip surface sloping from a top lip to a base;

wherein said top lip forming a raised end of said deck platform for positioning on a curb;

wherein said curb ramp having a plurality of mounting hardware components for securing said curb ramp in a storage position;

wherein said plurality of mounting hardware having a first adjustable strap attached to a first side edge and a second adjustable strap attached to a second side edge;

wherein said first adjustable strap having a first free end, including a first e-track clip and a second end with a first fastener fastened to a first said side edge;

wherein said second adjustable strap having a first free end, including a second e-track clip and a second end with a second fastener fastened to a second said side edge;

wherein said first e-track clip for clipping said first adjustable strap to an e-track;

wherein said second e-track clip for clipping said second adjustable strap to said e-track;

wherein said first e-track clip removably fastened into a first groove in said e-track;

wherein said second e-track clip removably fastened into a second groove in said e-track;

wherein said first e-track clip and said second e-track clip having a material of rust-resistant metal; and further wherein said first adjustable strap and said second adjustable strap having adjustable lengths.

20. The curb ramp of claim 19, wherein said e-track is mounted to a box truck for securing said curb ramp thereto.

\* \* \* \* \*